United States Patent
Bostick et al.

(10) Patent No.: US 10,217,239 B2
(45) Date of Patent: Feb. 26, 2019

(54) PERSONALIZED POINT OF INTEREST GUIDANCE IN 360-DEGREE VIEWS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 11 days.

(21) Appl. No.: 15/433,015

(22) Filed: Feb. 15, 2017

(65) Prior Publication Data
US 2018/0232905 A1 Aug. 16, 2018

(51) Int. Cl.
| G06K 9/00 | (2006.01) |
| H04L 29/08 | (2006.01) |
| H04N 13/106 | (2018.01) |
| G06T 7/73 | (2017.01) |
| G06K 9/62 | (2006.01) |

(52) U.S. Cl.
CPC .............. *G06T 7/73* (2017.01); *G06K 9/0061* (2013.01); *G06K 9/6201* (2013.01); *G06T 2207/10004* (2013.01); *G06T 2207/30201* (2013.01); *H04L 67/10* (2013.01); *H04N 13/106* (2018.05)

(58) Field of Classification Search
USPC ....................... 382/154, 155; 463/43; 345/43
See application file for complete search history.

(56) References Cited

U.S. PATENT DOCUMENTS

| 6,912,565 B1 | 6/2005 | Powers et al. |
| 2004/0212712 A1* | 10/2004 | Stavely .................. A61B 3/113 348/333.03 |
| 2008/0036875 A1* | 2/2008 | Jones ................. H04N 5/23238 348/222.1 |
| 2010/0087257 A1* | 4/2010 | Deb ........................ G06N 3/006 463/43 |
| 2010/0295774 A1 | 11/2010 | Hennessey |

(Continued)

OTHER PUBLICATIONS

Virginia Tech; "Science from Virginia Tech", 2002.
Christie Digital Systems; Christie Cave—Cave Automatic Virtual Environment, 2017.

*Primary Examiner* — Kathleen Y Dulaney
(74) *Attorney, Agent, or Firm* — Garg Law Firm, PLLC; Rakesh Garg; Christopher K. McLane (57) ABSTRACT

Shifting of a focus of a first user within a first 360-view data is tracked during an observation of the first 360-view data by the first user to determine a first set of POIs in the 360-view data where the first user pauses for a duration. A subset of the first set of POIs is regarded as non-obvious POIs in the first 360-view data. For a second user who has not observed the 360-view data, a second set of POIs is computed and includes a second subset of non-obvious POIs. A non-obvious POI from the second subset is matched to a particular non-obvious POI in the first subset. During an observation of the first 360-view data by the second user, a location of focus is computed. Guidance is provided by computing a movement of the focus from the location to a non-obvious POI in the first 360-view data.

20 Claims, 9 Drawing Sheets

(56) References Cited

U.S. PATENT DOCUMENTS

| | | | |
|---|---|---|---|
| 2014/0168056 A1* | 6/2014 | Swaminathan | G06K 9/00604 |
| | | | 345/156 |
| 2014/0184550 A1* | 7/2014 | Hennessey | G06F 3/013 |
| | | | 345/173 |
| 2014/0344012 A1 | 11/2014 | Kamhi et al. | |
| 2016/0173775 A1* | 6/2016 | Lowry | H04N 5/23238 |
| | | | 348/36 |
| 2016/0260196 A1* | 9/2016 | Roimela | G06F 3/013 |
| 2016/0279516 A1* | 9/2016 | Gupta | A63F 13/5255 |
| 2016/0301862 A1* | 10/2016 | Rantakokko | G06F 3/011 |
| 2017/0168585 A1* | 6/2017 | Faaborg | G06F 3/017 |

\* cited by examiner

FIGURE 3
(PRIOR-ART)

PERSONALIZED POINT OF INTEREST GUIDANCE IN 360-DEGREE VIEWS

TECHNICAL FIELD

The present invention relates generally to a method, system, and computer program product for assisting users in viewing 360-degree views. More particularly, the present invention relates to a method, system, and computer program product for personalized POI guidance in a 360-degree view.

BACKGROUND

Within the scope if the illustrative embodiments, a 360-degree view is a panoramic view of objects in a geographical space or virtual space, where the view is a photographic or virtualized view of the surroundings of the object. Hereinafter, a 360-degree view is interchangeably referred to as simply "view" or "360-view" unless expressly disambiguated where used.

A 360-view includes frames of visual data, e.g., picture or video data, where each frame depicts a partial view of the surroundings of the object. A user can see or otherwise perceive a 360-view by panning across frames, tilting across frames, or both—panning and tilting across frames of the 360-view. As a non-limiting example, a 360-view of a house—as provided by the street-view feature of some navigation applications—includes a view from the point of view of a viewer positioned in front of the house and observing the house and its surroundings, e.g., to the north, south, east, and west of the house. In some cases, a view above the house, e.g., of the roofline and the sky, or below, e.g., of the ground or features lying at a lower level than the house, are also included in the 360-view. Similarly, in a virtual world, such as in a virtual gaming environment, an avatar of the user can be presented with a 360-view of the avatar's lateral surroundings, vertical surroundings, or both.

SUMMARY

The illustrative embodiments provide a method, system, and computer program product. An embodiment includes a method that tracks a shifting of a focus of a first user within a first 360-view data during an observation of the first 360-view data by the first user, the tracking producing tracking data. The embodiment analyzes the tracking data to determine a first set of POIs in the 360-view data, wherein the first user pauses for a duration greater than a threshold duration at each POI in the first set of POIs, wherein a POI in the first set of POIs is a non-obvious POI when the 360-view data excludes any data configured to attract the focus of the first user to the POI. The embodiment records a subset of the first set of POIs as non-obvious POIs in the first 360-view data. The embodiment computes, for a second user who has not observed the 360-view data, a second set of POIs, the second set of POIs including a second subset of non-obvious POIs. The embodiment matches a non-obvious POI from the second subset to a particular non-obvious POI in the first subset. The embodiment computes, during an observation of the first 360-view data by the second user, a location of focus of the second user. The embodiment computes a parameter of a movement of the focus of the second user from the location to the particular non-obvious POI in the first 360-view data. The embodiment guides the second user from the location to the particular non-obvious POI using the parameter of the movement.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

A point of interest (POI) in a 360-view is an object, person, event, phenomenon, setting, occurrence, or some other classification of a visually portrayed artifact in some frame of the 360-view. The illustrative embodiments recognize that a 360-view can include numerous POIs. The POIs in a given 360-view can be of a wide variety, and can be scattered amongst various frames that form the 360-view.

The illustrative embodiments further recognize that some POIs in a 360-view are expected, or obvious. For example, if the 360-view depicts a speech setting by a speaker, the speaker, the podium, and the objects on the stage are expected to be points of interest for the users who see the 360-view. The illustrative embodiments recognize that some POIs are non-obvious in a given 360-view. For example, consider the same 360-view about the speaker's speech. There could be a protestor in the crowd behind the point of view from which the 360-view has been captured, or a flag mounted on a side wall away from the stage. Such a protestor, or flag, or another artifact may be a non-obvious POI in that such artifacts are not of primary concern in the 360-view but may be of interest to some or all users of the 360-view.

Some other examples of obvious POIs include but are not limited to a speaker speaking into the camera, a house in its surroundings, a celebrity, an interviewer, an interviewee, a centerpiece of a setting, and the like. Some other examples of non-obvious POIs include but are not limited to a person in the crowd where the speaker is speaking, an object on the road across the house in the house's surroundings, an object in the room of the celebrity, the equipment covering the interviewer, an object in view from the window across from the interviewee, a piece of furniture near the centerpiece, and the like.

The illustrative embodiments recognize that while obvious POIs in a given 360-view are readily observed by the users of the 360-view, the 360-view might include other non-obvious POIs that might be of interest to the user. The illustrative embodiments recognize that while perceiving a given 360-view a user can miss a POI in which the user is interested. For example, an obvious POI may be in front of the user's point of view, but a POI of interest to the user may be on a frame behind the user's point of view in the 360-view, i.e., the user may have to pan across several frames to turn around to bring into view that frame which is behind the user's point of view. Due to a lack of time, general interest in the primary POI of the 360-view, or lack of awareness, the user may not pan to the frame behind the user's point of view, and therefore miss the POI that was of interest to the user.

The illustrative embodiments recognize that the presently available tools or solutions do not address these needs or provide adequate solutions for these needs. The illustrative embodiments used to describe the invention generally address and solve the above-described problems and other problems related to personalized POI guidance in a 360-degree view.

An embodiment can be implemented as a software application. The application implementing an embodiment can be configured as a modification of an existing 360-view presentation system, as a separate application that operates in conjunction with an existing 360-view presentation system, a standalone application, or some combination thereof.

An embodiment analyzes a set of frames associated with a 360-view to identify the POIs corresponding to a specified set of classifications of artifacts present in the 360-view. For example, the embodiment identifies all humans present in a frame, and a set of buildings, vehicles, furniture, pets, equipment, text, events, and other classifications of objects present in the frame as well.

Thus, given a 360-view, the embodiment identifies a set of POIs present in the 360-view. The embodiment populates a POI repository associated with the 360-view with the set of identified POIs.

An embodiment obtains additional information about a POI from a data source. For example, if a human face is detected as a POI, the embodiment determines whether the person is celebrity and obtains the celebrity's information from a news source. As another example, if an equipment is identified as a POI, the embodiment uses an equipment manufacturer's data source to determine a type or specification of the equipment. The embodiment augments a POI entry in the POI repository of the 360-view with the additional information obtained about a POI.

Suppose that the 360-view is available for viewing to a group of users. Further suppose that the illustrative embodiments have to personalize the POI guidance for user "A" in the group who has not seen the 360-view.

Suppose that user B from the group has seen the 360-view. When user B is seeing, observing, or perceiving the 360-view, an embodiment analyzes the manner in which user B uses the 360-view. In particular, the embodiment tracks the user's gaze using a biometric sensor, such as a camera observing the user B's pupils. The embodiment may receive the tracking data from a sensor associated with the device used by user B for perceiving the 360-view.

The embodiment analyzes the tracking data of the user's gaze to determine where in the 360-view user B lingered. A "linger" is a pause of at least a threshold period in a movement of a user's gaze while perceiving a 360-view. For example, in a 360-view of a greenhouse, the user's gaze may pause, or linger, on a particular orchid growing in the greenhouse; or in a 360-view of a speaker giving a speech, the user's gaze may linger on the flag that is mounted on the wall far away from the stage.

The embodiment locates the frame where user B's linger occurred, and identifies the coordinates of an area within the frame on which user B lingered. The embodiment analyzes the area with in the coordinates to identify a POI that is located within the area.

The embodiment stores the linger data in a repository, which may also be associated with the 360-view. The embodiment determines whether the POI in the area is an obvious POI or a non-obvious POI. For example, if user B lingered on the speaker when the 360-view was about the speaker giving a speech, the speaker would be an obvious POI on which user B would be expected to focus. On the other hand, if user B lingered on the flag far away from the speaker when the 360-view was about the speaker giving a speech, the flag would be a non-obvious POI on which user B would focus if the user was interested in that POI.

In many cases, there can be other clues that are useful in determining whether a POI is obvious or non-obvious, and therefore, whether lingering on that POI is an obvious linger or a non-obvious linger, respectively. For example, the speaker may be gesturing towards the flag during the speech, trying to draw the crowd's attention to the flag. Under such circumstances, the flag becomes an obvious POI. The clue in this example comes from an analysis of the analysis of the gesture present in the frame.

Other methods of finding a clue include but are not limited to analyzing an audio of the 360-view to determine whether the POI is being discussed, or analyzing an image within the frame—such as an image of an arrow pointing towards the flag—to determine whether attention is intentionally drawn towards the POI in the frame (making the POI an obvious POI), or whether the user focused on the POI due to the user's interest (making the POI a non-obvious POI). The embodiment thus correspondingly classifies the linger as obvious or non-obvious. A source of the audio in the 360-view may similarly point in the direction of an obvious POI, an attracting or distracting imagery or sound may also identify an obvious POI.

These examples of obvious/non-obvious POIs and manner of determining them are not intended to be limiting. From this disclosure, those of ordinary skill in the art will be able to conceive many other ways of determining whether a POI is obvious or non-obvious, and the same are contemplated within the scope of the illustrative embodiments.

Now, suppose that user A, who has not yet perceived the 360-view, has perceived other 360-view's. An embodiment accesses a repository of historical linger data associated with such other 360-view. The embodiment analyzes the historical linger data to determine the POIs on which user A non-obviously lingered. From the linger data of one or more other 360-views perceived by user A, the embodiment identifies a set of non-obvious POIs, their types, or other characteristics. The identified set of non-obvious POIs, their types, or other characteristics are specific to user A, or in other words, personalized for user A.

A user's personal preferences for POIs may also be available from a user's profile. For example, user A may configure a profile specifying the object classifications of interest to the user, specific persons or artifacts of interest of the user, or both. An embodiment also uses such a profile, if available, for user A to determine the POIs that are of interest to user A.

A user's personal preferences for POIs may also be available from a user's social media data. For example, user A may socially discuss the object classifications of interest to the user, specific persons or artifacts of interest of the user, or both. As another example, persons within the user's social network, if identified in a 360-view, may be POIs for the user. An embodiment also uses such social data, if available, for user A to determine the POIs that are of interest to user A.

Now, for a given 360-view, given the POI repository associated with the 360-view, and given the user-specific POIs for user A, an embodiment determines a subset of non-obvious POIs in the 360-view that might be of interest to user A. Stated another way, the embodiment selects from the POI repository those non-obvious POIs in the 360-view which share some characteristics with the POIs in which user A has interest. This selected subset of non-obvious POIs in the 360-view is a personalized set of non-obvious POIs in the 360-view for user A.

When user A is perceiving the 360-view, an embodiment determines the location of the gaze of user A and determines where in the 360-view the user is looking. The embodiment determines a location of a POI from the personalized set of non-obvious POIs in the 360-view for user A. The embodiment computes a direction and amount of movement that the user should apply to bring the determined location in view of user A in the 360-view.

The embodiment renders the direction, amount, or both of the computed movement such that user A can perceive the rendering. For example, the embodiment may render the computed information in visual form overlaid on a frame of the 360-view that is presently being viewed by user A. Those of ordinary skill in the art will be able to conceive many other ways of rendering the computed information to the user, and the same are contemplated within the scope of the illustrative embodiments. For example, the computed direction and amount of movement can be provided to the user as any of audio, video, text, or tactile feedback.

For example, in one implementation, an earphone associated with the device that the user is using to perceive the 360-view may produce an audio instruction "pan left one hundred and eighty degrees to see a Ferris wheel." As another example, in another implementation, a tactile interface associated with the device that the user is using to perceive the 360-view may produce a left-sided tactile feedback of an intensity proportional to 180-degrees. As another example, in another implementation, while the user is using to perceive the 360-view, a textual message may be superimposed over the 360-view frame stating "pan left one hundred and eighty degrees to see a Ferris wheel."

The manner of personalized POI guidance in a 360-degree view described herein is unavailable in the presently available methods. A method of an embodiment described herein, when implemented to execute on a device or data processing system, comprises substantial advancement of the functionality of that device or data processing system in ensuring that a user does not miss any POIs of a given 360-view in which the user might have a user-specific interest.

The illustrative embodiments are described with respect to certain types of views, frames, POIs, classifications, information, repositories, data sources, analyses, lingers, renderings, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
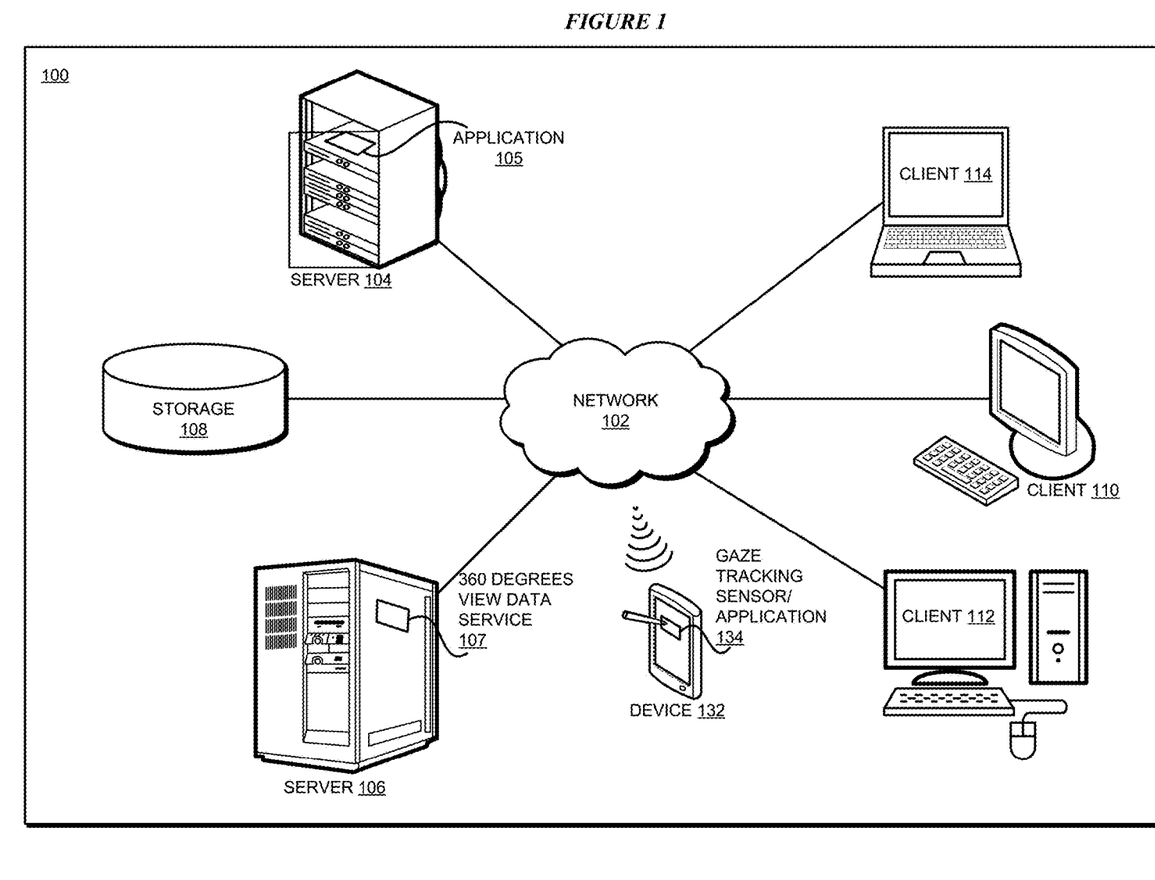
FIG. 1 depicts a block diagram of a network of data processing systems in which illustrative embodiments may be implemented.
Figure 2:
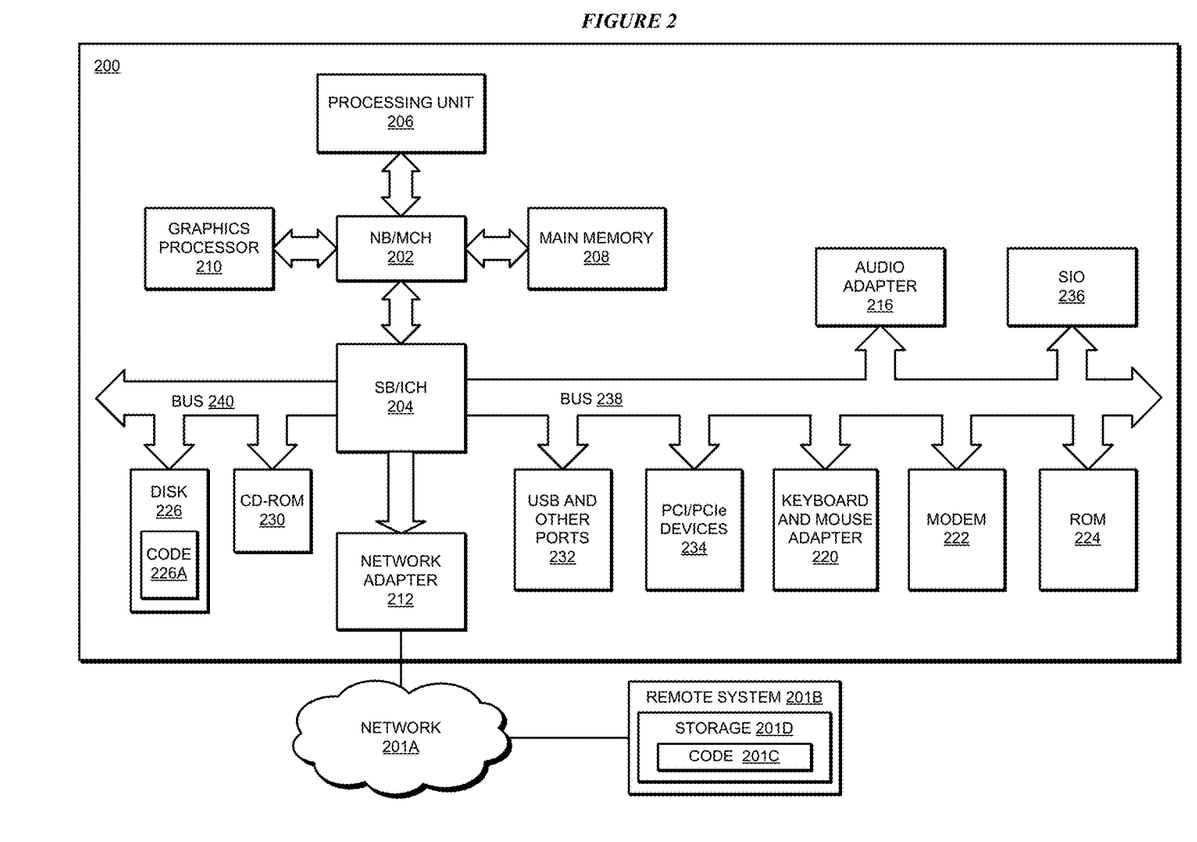
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Data service 107 produces 360-view data for use in device 132, as described herein. Gaze tracking sensor and/or application 134 associated with device 132 provides the gaze tracking measurements to application 105, as described herein. One or more repositories described herein can be stored locally at device 132, locally at server 104, in storage 108, or in some combination thereof.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/

PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
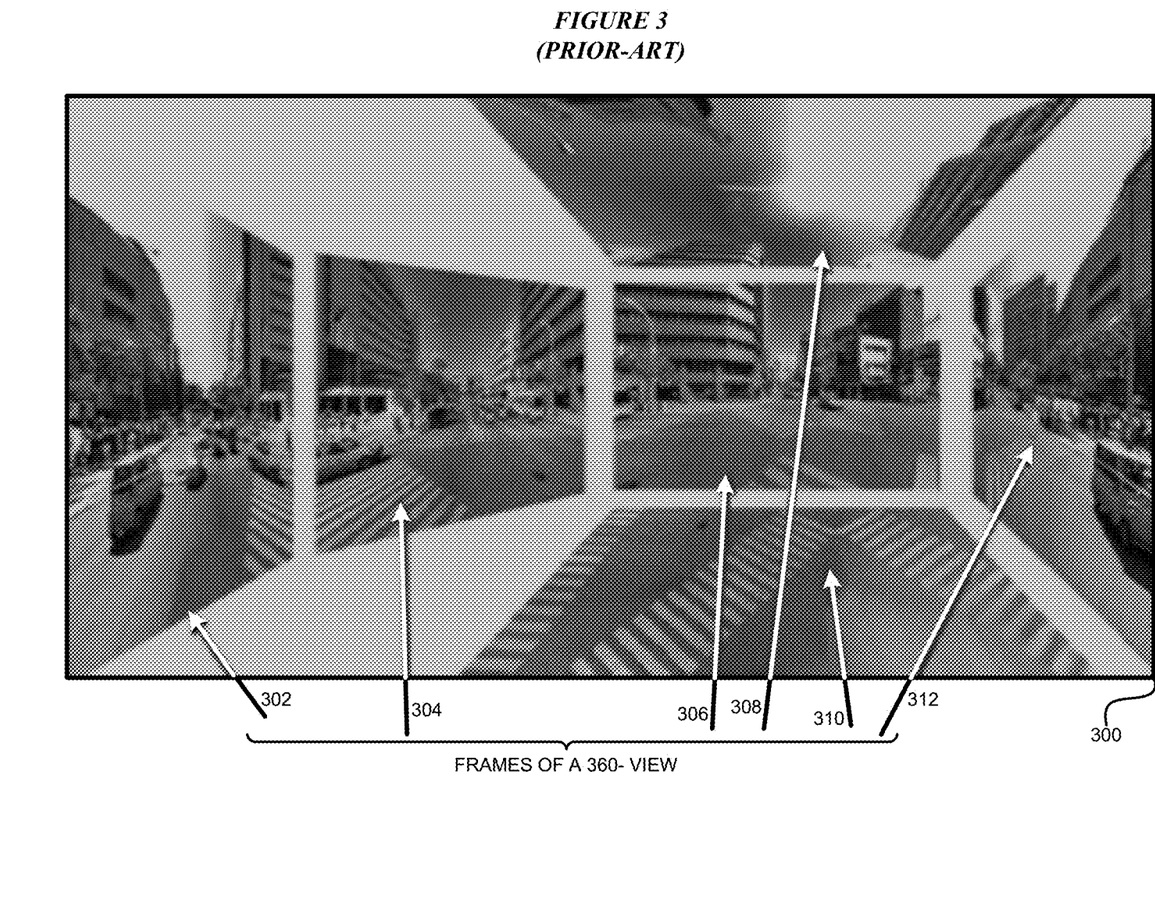
FIG. 3 depicts an example 360-view whose use can be improved with an illustrative embodiment.

With reference to FIG. 3, this figure depicts an example 360-view whose use can be improved with an illustrative embodiment. 360-view 300 includes frames 302, 304, 306, 308, 310, and 312, as shown, among other possible frames that are not shown. Obvious and/or non-obvious POIs may be located on any of frames 302-312, or on other frames (not shown) of 360-view 300.

Figure 4:
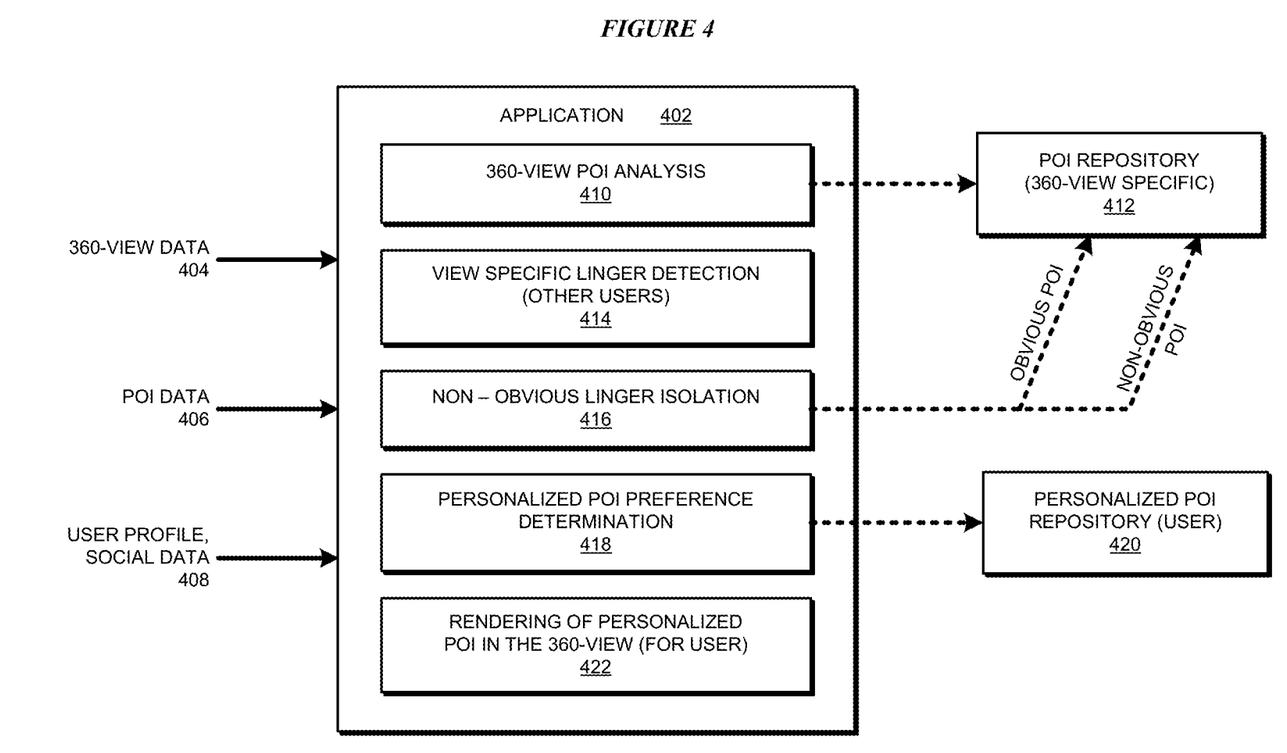
FIG. 4 depicts a block diagram of an example configuration of an application for personalized POI guidance in a 360-degree view in accordance with an illustrative embodiment.

With reference to FIG. 4, this figure depicts a block diagram of an example configuration of an application for personalized POI guidance in a 360-degree view in accordance with an illustrative embodiment. Application 402 is an example of application 105 in FIG. 1.

360-view data 404 is produced by a 360-view source or service, such as 360-view data service 107 in FIG. 1. POI data 406 is provided by one or more data sources, as described herein. User data 408 comprises some combination of the profile data of a user, social data of the user, or other similarly purposed data for use in a manner described herein.

Component 410 analyzes a set of frames in 360-view data 404 to identify a set of POIs. Application 402 may be pre-configured to detect POIs of certain classifications. Component 410 populates POI repository 412, which is associated with 360-view data 404, with the set of identified POIs.

Component 414 analyzes the gaze tracking data from one or more other users who have already used 360-view data 404. Using the gaze tracking data, component 414 detects the POIs in 360-view data 404 where one or more other users have lingered. Thus, component 414 produces a set of 360-view-specific POIs where one or more other users have lingered.

For a POI in the 360-view-specific set of POIs generated by component 414, component 416 analyzes whether the POI is obvious given the content of 360-view data 404, or non-obvious according to a preference of the user who lingered there. Component 416 annotates, marks, labels, flags, or otherwise identifies certain 360-view-specific POIs in repository 412 as non-obvious as a result of this analysis.

Optionally, component 416 may also identify obvious POIs in repository 412 in a similar manner.

Component 418 uses user data 408 corresponding to a user who has not perceived 360-view data 404 yet, to determine POI preferences of the user. Component 418 uses repository 412 and user data 408 to construct user-specific personalized POI repository 420. Repository 420 includes a subset of these non-obvious POIs in 360-view data 404 where other users have non-obviously lingered, and which correspond to the POI preferences of the user in question.

Component 422 computes a direction and/or an amount of movement that the user should make in the user's viewing of the 360-view to reach a POI in repository 420. Component 422 renders the computed direction and/or amount of movement information to the user in one or more ways in a manner described herein.

Figure 5:
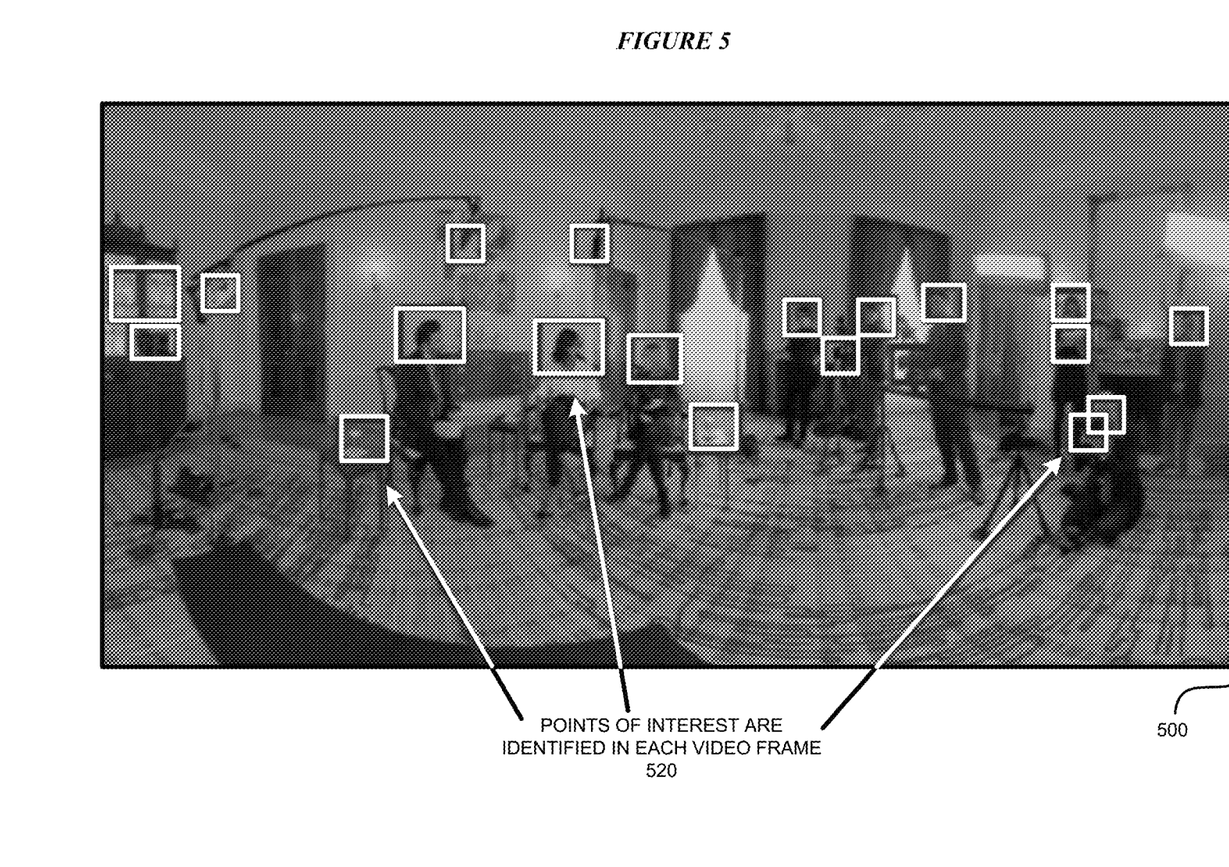
FIG. 5 depicts a POI analysis operation in accordance with an illustrative embodiment.

With reference to FIG. 5, this figure depicts a POI analysis operation in accordance with an illustrative embodiment. 360-view 500 is an example of 360-view data 404 in FIG. 4. Only as a non-limiting example, 360-view 500 is shown as a part of a 360-view video data in which frames are merged together to form the panoramic view of an example setting. An operation of an embodiment, such as the operation of component 410 in FIG. 4, identifies the artifacts shown in white boxes as possible POIs 502 in 360-view 500. As can be seen, a variety of classifications of artifacts—e.g., faces, equipment, furniture, etc.—are identified as possible POIs.

Figure 6:
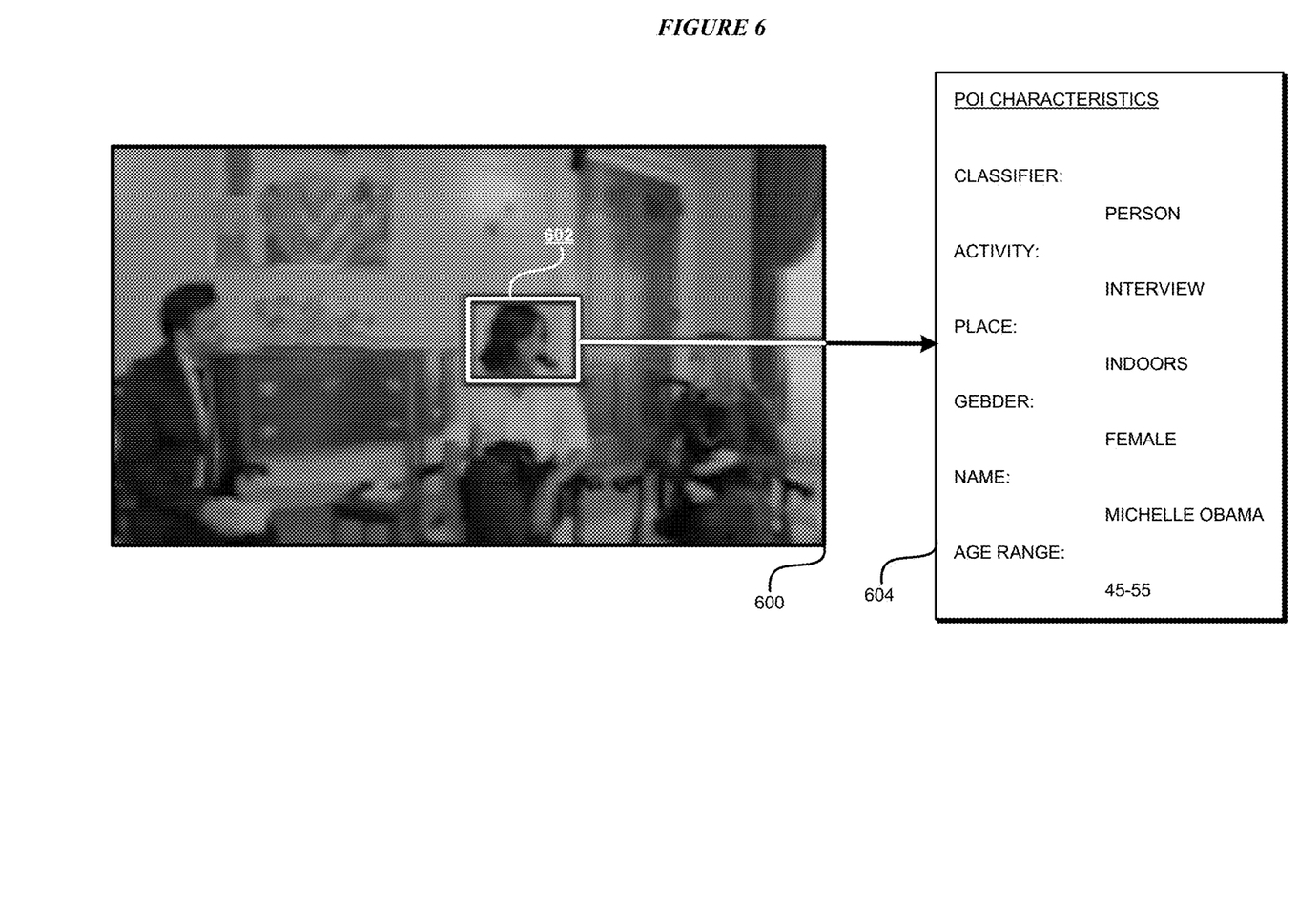
FIG. 6 depicts an example of additional information that can be populated with an identified POI in accordance with an illustrative embodiment.

With reference to FIG. 6, this figure depicts an example of additional information that can be populated with an identified POI in accordance with an illustrative embodiment. Frame 600 is a portion of 360-view 500 in FIG. 5.

Suppose that POI 602 identified in frame 600 is a celebrity figure. An operation of an embodiment, such as that of component 410 in FIG. 4, collects additional information 604 in the form of POI data 406 in FIG. 4, from a data source. The operation then populates repository 412 in FIG. 4 with POI 602 and additional information 604.

Figure 7:
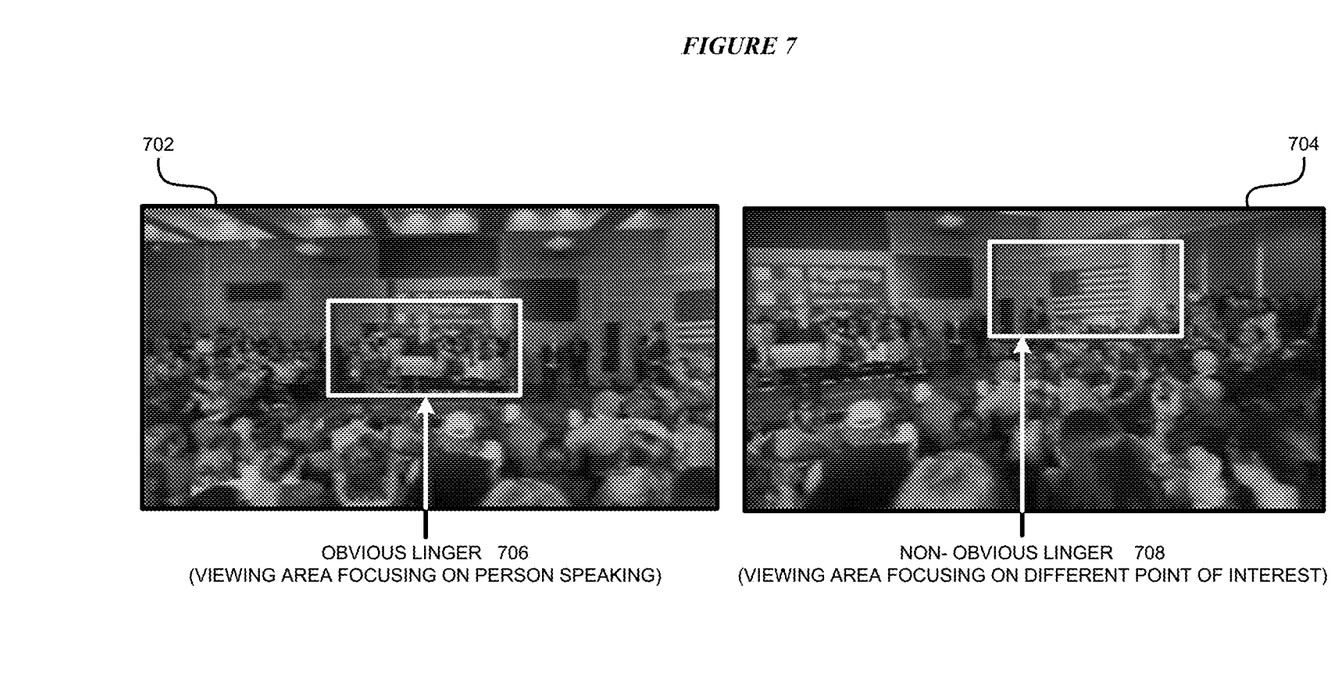
FIG. 7 depicts a detection of a non-obvious linger in accordance with an illustrative embodiment.

With reference to FIG. 7, this figure depicts a detection of a non-obvious linger in accordance with an illustrative embodiment. Suppose that frames 702 and 704 are two example frames in a 360-view, such as in a 360-view similar to 360-view 500 in FIG. 5. The example setting in the 360-view from which frames 702 and 704 are taken is where a speaker is delivering a speech to a crowd. The speaker is an obvious POI (as shown by the white box in frame 702) and users perform obvious linger 706 at that POI as expected.

In contrast, the fag mounted far from the speaker is visible in frame 704 and has no special gesture, sound, or visual directing attention to it in the 360-view. The flag (as shown by the white box in frame 704) is a non-obvious POI, and some user has performed non-obvious linger 708 at that POI. An operation of an embodiment, such as the operation of component 416 in FIG. 4, distinguishes between linger 706 and linger 708.

Figure 8:
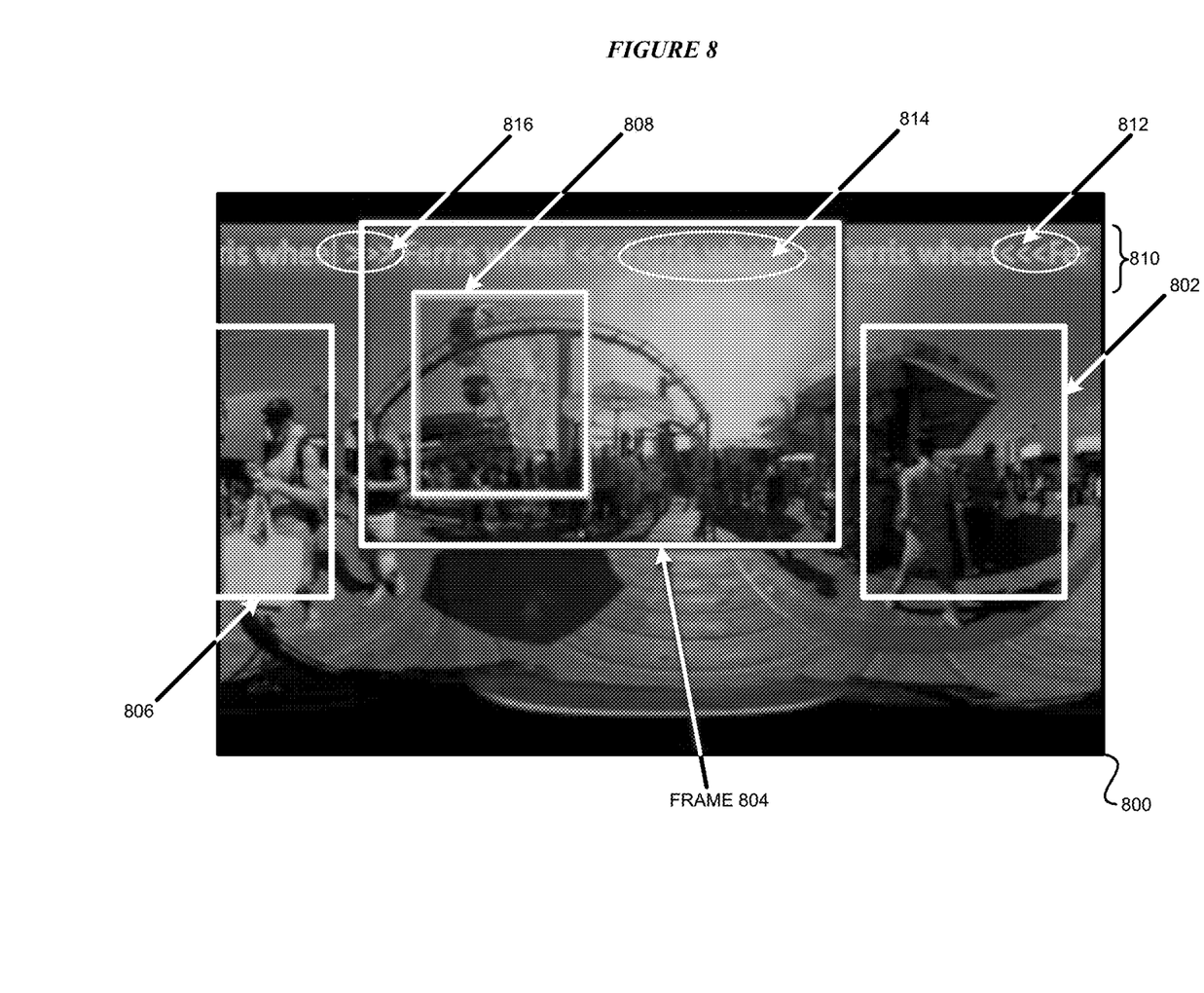
FIG. 8 depicts an example rendering operation in accordance with an illustrative embodiment.

With reference to FIG. 8, this figure depicts an example rendering operation in accordance with an illustrative embodiment. 360-view 800 is another example 360-view in the manner of 360-view 500 in FIG. 5 and comprises a set of frames. Frames 802, 804, and 806 are some such frames in 360-view 800.

Suppose that frame 804 includes, as an example, POI of interest 808 to a particular user who is observing 360-view 800. Example POI 808 is a Ferris wheel.

Suppose that the user is focused on a frame other than frame 804 at a given time, e.g., on frame 802. An operation of an embodiment, such as an operation of component 422 in FIG. 4, determines that POI 808 in frame 804 will be of interest to the user. The operation computes that the user would have to move the gaze left to reach frame 804 from frame 802. Optionally, the operation also computes a distance of the movement.

The operation renders the computed direction and optionally the distance in 360-view 800. For example, the operation causes rendering 810 to appear in 360-view 800. Rendering 810 includes, as a non-limiting example, direction indicator 812 prompting the user to move left. Optionally, a number of chevrons in indicator 812, or text accompanying indicator 812 can inform the user how far the POI is from the user's present focus. Optionally, rendering 810 can also include additional information 814 about POI 808, which in the depicted example is the text "Ferris wheel."

Similarly, if the user were initially focused on frame 806 instead of frame 802, rendering 810 would include a different direction and possibly different distance measurement as well. For example, to move from frame 806 to frame 804, the user is prompted to move right via indicator 816. Again, some component of indicator 816 can inform the user about the distance to move.

Figure 9:
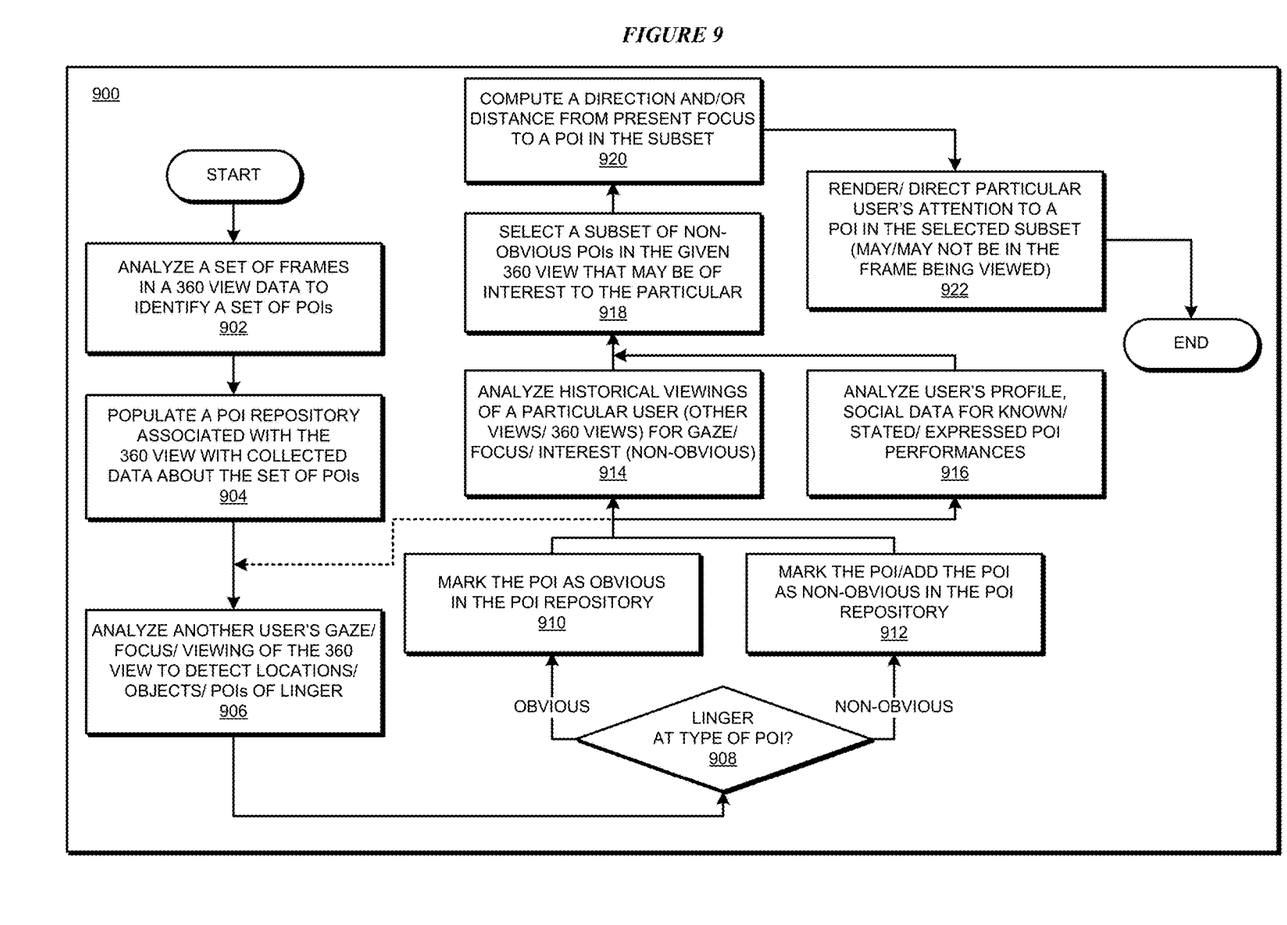
FIG. 9 depicts a flowchart of an example process for personalized POI guidance in a 360-degree view in accordance with an illustrative embodiment.

With reference to FIG. 9, this figure depicts a flowchart of an example process for personalized POI guidance in a 360-degree view in accordance with an illustrative embodiment. Process 900 can be implemented in application 402 in FIG. 4.

The application analyzes a set of frames in a given 360-view data to identify a set of POIs present therein (block 902). The application populates a repository associated with the 360-view with the set of POIs and the additional data collected about one or more POIs in the set of POIs (block 904).

The application analyzes another user's gaze/focus tracking data from the other user's viewing of the 360-view to detect the POIs where the other user lingers while viewing the 360-view (block 906). The application determines a type of the POI where the other user lingers (block 908).

If the other user lingers at an obvious POI in the 360-view ("Obvious") path of block 908), the application optionally marks that POI in the repository as obvious (block 910). If the other user lingers at a non-obvious POI in the 360-view ("Non-obvious") path of block 908), the application marks that POI in the repository as non-obvious (block 912). The application returns to block 906 to process as many lingers of one or more other users as permitted in a particular implementation.

For personalization to a particular user, the application analyzes historical gaze tracking data from previous viewings of other 360-views by the particular user (block 914). Particularly, in block 914, the application analyzes the particular user's tracking data to determine the particular user's non-obvious POIs in the other 360-views.

The application may also analyze a profile and/or social data of the particular user to determine expressly identified POIs therein, of deduce user's preference of certain POIs therefrom, as described herein (block 916).

The application selects a subset of the non-obvious POIs from the POI repository of the given 360-view such that the non-obvious POIs in the subset match (to at least a threshold degree) the non-obvious POIs that are of particular interest to the user in question (block 918). The application computes a direction of movement, a distance of movement, or both from a present location of the user's focus to a POI in the selected subset (block 920). The application renders or otherwise directs the user, according to the computed direction and/or distance, from the location of the present focus to the personalized non-obvious POI in the selected subset (block 922). The application ends process 900 thereafter.

Thus, a computer implemented method, system or apparatus, and computer program product are provided in the illustrative embodiments for personalized POI guidance in a 360-degree view and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    tracking a shifting of a focus of a first user within a first 360-view data during an observation of the first 360-view data by the first user, the tracking producing tracking data;
    analyzing the tracking data to determine a first set of POIs in the 360-view data, wherein the first user pauses for a duration greater than a threshold duration at each POI in the first set of POIs, wherein a POI in the first set of POIs is a non-obvious POI when the 360-view data excludes any data configured to attract the focus of the first user to the POI;
    recording a subset of the first set of POIs as non-obvious POIs in the first 360-view data;
    computing, for a second user who has not observed the 360-view data, a second set of POIs, the second set of POIs including a second subset of non-obvious POIs;
    matching a non-obvious POI from the second subset to a particular non-obvious POI in the first subset;
    computing, during an observation of the first 360-view data by the second user, a location of focus of the second user;
computing a parameter of a movement of the focus of the second user from the location to the particular non-obvious POI in the first 360-view data; and
guiding the second user from the location to the particular non-obvious POI using the parameter of the movement.

2. The method of claim 1, further comprising:
    tracking a shifting of a focus of a second user within a second 360-view data during an observation of the second 360-view data by the second user, to produce second tracking data;
    analyzing the second tracking data to compute the second set of POIs; and
    computing a characteristic from a non-obvious POI in the second subset of non-obvious POIs, wherein the characteristic is used in the matching.

3. The method of claim 2, wherein the second user observes the second 360-view data prior to observing the first 360-view data.

4. The method of claim 1, further comprising:
    analyzing a profile of the second user, wherein a characteristic of a non-obvious POI in the second subset of non-obvious POIs is specified in the profile, and wherein the characteristic is used in the matching.

5. The method of claim 1, further comprising:
    analyzing a social data of the second user, wherein a characteristic of a non-obvious POI in the second subset of non-obvious POIs is deduced from the social data, and wherein the characteristic is used in the matching.

6. The method of claim 1, further comprising:
    configuring a biometric sensor to perform the tracking by measuring eye movements of the first user during the observation.

7. The method of claim 1, further comprising:
    analyzing the first 360-view data to determine that a portion of the first 360-view data is configured to attract an attention of any user towards a second subset of the first set of POIs in the first 360-view data;
    recording the second subset of the first set of POIs as obvious POIs in the first 360-view data.

8. The method of claim 1, wherein the parameter of movement is a direction of the movement.

9. The method of claim 1, wherein the parameter of movement is an amount of the movement.

10. The method of claim 1, wherein the guiding further provides additional data associated with the particular non-obvious POI in the first 360-view data.

11. The method of claim 1, wherein the first 360-view data comprises a 360-degree video.

12. The method of claim 1, wherein the first 360-view data comprises a 360-degree graphical representation of a virtual visual environment.

13. A computer usable program product comprising one a computer readable storage medium, and program instructions stored on the computer readable storage medium, the stored program instructions comprising:
    program instructions to track a shifting of a focus of a first user within a first 360-view data during an observation of the first 360-view data by the first user, the tracking producing tracking data;
    program instructions to analyze the tracking data to determine a first set of POIs in the 360-view data, wherein the first user pauses for a duration greater than a threshold duration at each POI in the first set of POIs, wherein a POI in the first set of POIs is a non-obvious POI when the 360-view data excludes any data configured to attract the focus of the first user to the POI;
    program instructions to record a subset of the first set of POIs as non-obvious POIs in the first 360-view data;
    program instructions to compute, for a second user who has not observed the 360-view data, a second set of POIs, the second set of POIs including a second subset of non-obvious POIs;
    program instructions to match a non-obvious POI from the second subset to a particular non-obvious POI in the first subset;
    program instructions to compute, during an observation of the first 360-view data by the second user, a location of focus of the second user;
program instructions to compute a parameter of a movement of the focus of the second user from the location to the particular non-obvious POI in the first 360-view data; and
program instructions to guide the second user from the location to the particular non-obvious POI using the parameter of the movement.

14. The computer usable program product of claim 13, further comprising:
program instructions to track a shifting of a focus of a second user within a second 360-view data during an observation of the second 360-view data by the second user, to produce second tracking data;
program instructions to analyze the second tracking data to compute the second set of POIs; and
program instructions to compute a characteristic from a non-obvious POI in the second subset of non-obvious POIs, wherein the characteristic is used in the matching.

15. The computer usable program product of claim 14, wherein the second user observes the second 360-view data prior to observing the first 360-view data.

16. The computer usable program product of claim 13, further comprising:
program instructions to analyze a profile of the second user, wherein a characteristic of a non-obvious POI in the second subset of non-obvious POIs is specified in the profile, and wherein the characteristic is used in the matching.

17. The computer usable program product of claim 13, further comprising:
program instructions to analyze a social data of the second user, wherein a characteristic of a non-obvious POI in the second subset of non-obvious POIs is deduced from the social data, and wherein the characteristic is used in the matching.

18. The computer usable program product of claim 13, wherein the computer usable code is stored in a computer readable storage medium in a data processing system, and wherein the computer usable code is transferred over a network from a remote data processing system.

19. The computer usable program product of claim 13, wherein the computer usable code is stored in a computer readable storage medium in a server data processing system, and wherein the computer usable code is downloaded over a network to a remote data processing system for use in a computer readable storage medium associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to track a shifting of a focus of a first user within a first 360-view data during an observation of the first 360-view data by the first user, the tracking producing tracking data;
program instructions to analyze the tracking data to determine a first set of POIs in the 360-view data, wherein the first user pauses for a duration greater than a threshold duration at each POI in the first set of POIs, wherein a POI in the first set of POIs is a non-obvious POI when the 360-view data excludes any data configured to attract the focus of the first user to the POI;
program instructions to record a subset of the first set of POIs as non-obvious POIs in the first 360-view data;
program instructions to compute, for a second user who has not observed the 360-view data, a second set of POIs, the second set of POIs including a second subset of non-obvious POIs;
program instructions to match a non-obvious POI from the second subset to a particular non-obvious POI in the first subset;
program instructions to compute, during an observation of the first 360-view data by the second user, a location of focus of the second user;
program instructions to compute a parameter of a movement of the focus of the second user from the location to the particular non-obvious POI in the first 360-view data; and
program instructions to guide the second user from the location to the particular non-obvious POI using the parameter of the movement.

* * * * *